United States Patent Office 3,431,070
Patented Mar. 4, 1969

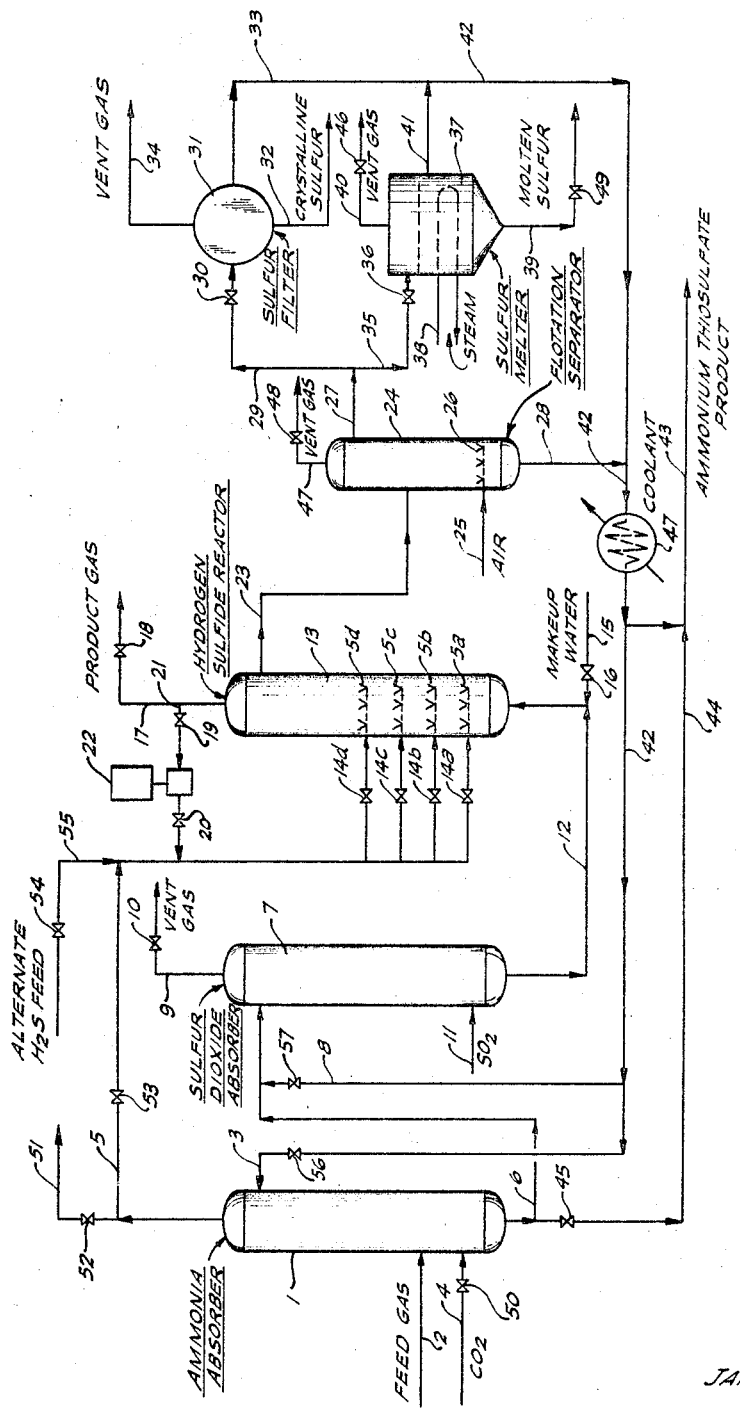

3,431,070
METHOD OF TREATING AMMONIA AND HYDROGEN SULFIDE GASES TO PRODUCE AMMONIUM THIOSULFATE AND SULFUR THEREFROM
James L. Keller, Fullerton, Calif., assignor to Union Oil Company of California, Los Angeles, Calif., a corporation of California
Filed Apr. 28, 1964, Ser. No. 363,212
U.S. Cl. 23—115   15 Claims
Int. Cl. C01b 17/64, 17/04

ABSTRACT OF THE DISCLOSURE

A process for producing ammonium thiosulfate and sulfur in which ammonia is absorbed in an aqueous solution of ammonium thiosulfate and reacted with sulfur dioxide in the absence of any substantial quantity of hydrogen sulfide, the product of this reaction being then reacted with hydrogen sulfide to yield aqueous ammonium thiosulfate and sulfur. The ammonium thiosulfate and sulfur can be recovered from the aqueous media.

---

This invention relates to a method of treating ammonia and hydrogen sulfide gases and more particularly to a process for reacting ammonia and hydrogen sulfide to form ammonium thiosulfate and sulfur.

Ammonia and hydrogen sulfide gases are frequently found in combination, either as two component gaseous mixtures or admixed with other gaseous components. Such mixtures are often the byproduct of petroleum refining and chemical processing, particularly where crude oils and feed stocks containing nitrogen and sulfur compounds are processed. Not only can ammonia and hydrogen sulfide occur naturally in the raw material, but they can be produced as decomposition products from such processes as distillation, cracking, and coking. All, or a portion, of the nitrogen and sulfur content of a feed material can be removed by catalytic conversion to ammonia and hydrogen sulfide in catalytic hydrogen treating processes such as hydrodesulfurization, hydrocracking, and reforming. These byproduct gases were once considered waste and either discharged directly to the atmosphere or burned in combustion furnaces to recover their fuel value. Because of the odor and toxicity of the uncombusted gases, and to recover their fuel value, combustion was preferred. Even so, combustion is not a desirable means of disposal as the oxides of nitrogen and sulfur found in the flue gases are corrosive, cause unsightly stack plumes and contribute to atmospheric pollution. In addition to byproduct gases requiring disposal, ammonia and hydrogen sulfide are also found in sulfidic waters produced from such processes or obtained by scrubbing the aforementioned gases to remove the ammonium and hydrogen sulfide therefrom. In the past, waste sulfidic waters were frequently disposed of by discharging them to streams, rivers, lakes, oceans, or other convenient bodies of water.

With the advent of increased concern regarding water source and atmospheric pollution, and because of regulations concerning plant water and gaseous effluent quality, various processes have been developed to treat these byproduct effluent streams. Stripping of the noxious ammonia and hydrogen sulfide from the sulfidic water has long been recognized as a means of improving the quality of effluent waters. However, disposal of the ammonia and hydrogen sulfide gases continued to be a problem. Most prior art processes have either been complicated, required extensive plant investment, entailed high operating costs, failed to produce a readily marketable product for which a reasonably stable demand existed, or were unsuitable for the treatment of relatively small or intermittent byproduct streams. Some of these processes, although providing a suitable means of disposing of the byproduct effluents, failed to yield products in a recoverable state. Thus, no return from the sale of resulting products could be realized. Other of these processes merely changed the undesirable contaminant to a less noxious form, but without complete removal from the effluent stream, thereby merely minimizing the problem without effecting a complete solution thereto.

Although ammonia and hydrogen sulfide disposal problems are prevalent in the petroleum refining and chemical processing industries, such problems are not confined thereto and can be encountered in the ore reduction and metal refining, paper, coal distillation and similar processing industries. Even though my process is particularly suitable for the treatment of byproduct ammonia and hydrogen sulfide, it is not so limited and can in fact be practiced in any instance where ammonia and hydrogen sulfide gases coexist, or where ammonia and hydrogen sulfide gases are separately available, either in the pure state or admixed with other gases.

It is therefore among the objects of my invention to provide an improved process for the treatment of gaseous mixtures of ammonia and hydrogen sulfide.

Another object of my invention is to provide a new method of removing ammonia and hydrogen sulfide from a mixture of gaseous components thereby yielding a purified gaseous product.

A further object of my invention is to provide a method of reacting ammonia and hydrogen sulfide gases so as to produce ammonium thiosulfate.

A yet further object of my invention is to provide a method of reacting ammonia and hydrogen sulfide gases to produce ammonium thiosulfate and sulfur.

A still further object of my invention is to provide an economical method of manufacturing concentrated ammonium thiosulfate solutions.

Other objects and advantages of my invention will become apparent to those skilled in the art on analysis of the description and illustrations contained herein.

I have found that the foregoing objects and their attendant advantages can be realized by reacting ammonia and hydrogen sulfide according to the method described herein. The exact reaction mechanism, completeness of reaction and ultimate reaction products depend on the composition of the feed gas mixture and the processing conditions; essentially complete reaction being obtainable, under suitable conditions, where the ammonia content of the feed gas does not exceed 3.0 moles of ammonia per mole of hydrogen sulfide. The reaction products of my process are usually ammonium thiosulfate and elemental sulfur, the proportion of each depending on the feed gas composition. Where the ammonia content of the feed gas is at least 3.0 moles per mole of hydrogen sulfide, the reactants are converted to ammonium thiosulfate with substantially no sulfur being formed. At the other extreme of feed gas composition, where the feed gas contains hydrogen sulfide but no ammonia, all of the thiosulfate formed is further reduced, sulfur being the only net reaction product.

In the practice of my process, the ammonia content of the feed gas is first absorbed in an aqueous solution of ammonium thiosulfate to yield a substantially ammonia-free gas containing hydrogen sulfide and other constituents of the feed gas mixture, and an ammonia-rich ammonium thiosulfate solution. Where the ammonia and hydrogen sulfide are not admixed, only the ammonia is fed to the ammonia absorption step. The ammonia-rich aqueous solution is treated with a proper quantity of sulfur dioxide to form bisulfites, which can be further reacted to ammonium thiosulfate and sulfur. The sulfur dioxide reacts with the absorbed ammonia to form ammonium bisulfite according to the reaction:

$$NH_3 + SO_2 + H_2O \rightarrow NH_4^+ + HSO_3^- \qquad (1)$$

The remainder of the sulfur dioxide, in excess of that required to neutralize the ammonia, forms sulfurous acid as follows:

$$SO_2 + H_2O \rightarrow H^+ + HSO_3^- \qquad (2)$$

Complete reaction of the ammonia and hydrogen sulfide content of the feed gas to ammonium thiosulfate, to sulfur, or to a mixture of ammonium thiosulfate and sulfur requires 0.5 mole of sulfur dioxide per mole of the total ammonia plus hydrogen sulfide reactant content of the feed gas. Addition of the proper quantity of sulfur dioxide is desirable, as the proportion of sulfur dioxide in part determines the completeness of reaction and ultimate yield of ammonium thiosulfate and sulfur. Insufficient sulfur dioxide results in an incomplete reaction leaving unreacted hydrogen sulfide, or, if ammonia is in excess in the feed gas mixture, yields a product contaminated with ammonium hydrosulfide and other undesirable contaminants. Excess sulfur dioxide merely forms additional ammonium bisulfite, sulfurous acid, or thiosulfuric acid, the particular byproduct depending on the proportions of ammonia and hydrogen sulfide in the initial feed gas. Thiosulfuric acid may further decompose to polythionates, sulfur, or sulfates, thereby adding additional impurities to the product.

The ammonium bisulfite and sulfurous acid content of the aqueous ammonium thiosulfate solution can be reacted with hydrogen sulfide in the substantially ammonia-free gaseous product from the ammonia scrubbing step according to the reaction:

$$4HSO_3^- + 2H_2S \rightarrow 3S_2O_3^{=} + 2H^+ + 3H_2O \qquad (3)$$

Thiosulfate-forming reaction (3) proceeds moderately rapidly and is accompanied by a reduction in pH. If a proper quantity of sulfur dioxide has been added, either bisulfite or hydrogen sulfide will be in excess, depending on the initial proportions of ammonia and hydrogen sulfide in the feed gas. Subsequent reactions then occur whereby additional ammonium thiosulfate and/or sulfur is formed, the exact mechanisms of these reactions again depending on the proportions of ammonia and hydrogen sulfide in the feed gas.

Unless the feed gas initially contained at least 3.0 moles of ammonia per mole of hydrogen sulfide, a portion of the thiosulfate formed according to reaction (3) will be reduced to sulfur by reaction with unreacted hydrogen sulfide as follows:

$$S_2O_3^{=} + 2H_2S + 2H^+ \rightarrow 4S + 3H_2O \qquad (4)$$

Since hydrogen ions produced in reaction (3) are consumed in reduction reaction (4), the reaction is pH dependent and will not proceed where the solution pH is above about 6.3, which condition can occur with insufficient sulfur dioxide addition or excess ammonia.

Where the initial feed gas contains equal molar proportions of ammonia and hydrogen sulfide, an equivalent quantity of sulfur dioxide is required and the reactions of Equations 3 and 4 can be expressed by the net reaction:

$$(Net)\ 2HSO_3^- + 2H_2S \rightarrow S_2O_3^{=} + 2S + 3H_2O \qquad (5)$$

If the initial feed gas contains other than equal molar quantities of ammonia and hydrogen sulfide, the excess reactant is consumed by further reactions, the particular mechanism and final products depending on whether ammonia or hydrogen sulfide is in excess. In the case where the initial feed contains hydrogen sulfide in excess of ammonia, the excess hydrogen sulfide reacts with a portion of the thiosulfate produced in the reaction of Equation 3 to form sulfur according to Equation 4. The net reaction for the excess hydrogen sulfide can be expressed as:

$$(Net)\ H^+ + HSO_3^- + 2H_2S \rightarrow 3S + 3H_2O \qquad (6)$$

Where the initial feed gas contains hydrogen sulfide, but no ammonia, all of the thiosulfate formed by reaction (3) will be reduced to sulfur by reaction (4), resulting in no net yield of thiosulfate.

If, on the other hand, ammonia is in excess, the mechanism of reacting the excess is believed somewhat different. In this case, reduction of the thiosulfate according to reaction (4) is retarded as the ammonia raises the solution pH. Since insufficient sulfur dioxide has been added to convert all of the ammonia to ammonium bisulfite, the ammonia is probably in solution as a mixture of ammonium sulfite and ammonium bisulfite. The sulfite and bisulfite are reacted with the excess hydrogen sulfide to form thiosulfate according to the reaction:

$$2SO_3^{=} + 2HSO_3^- + 2H_2S \rightarrow 3S_2O_3^{=} + 3H_2O \qquad (7)$$

As previously mentioned, product distribution is affected not only by feed gas composition, but by the amount of sulfur dioxide added. Although 0.5 mole of sulfur dioxide per mol of total ammonia plus hydrogen sulfide reactants are usually added to achieve complete reaction of ammonia and hydrogen sulfide to ammonium thiosulfate and/or sulfur, it is within the scope of my invention to add more, or less, sulfur dioxide.

Although the primary control of the chemical reactions and product yields is by the sulfur dioxide addition rate, pH may be used to monitor this control. The pH varies from point to point within my process, depending on the particular reactions taking place and the proportion of reactants. Ammonium thiosulfate in aqueous solution is mildly acid, with a pH of about 4, the exact value depending on concentration and temperature. This pH is raised by absorption of ammonia and lowered by absorption of sulfur dioxide, the magnitude of the changes depending on the concentration of these reactants. For example, absorption of equimolar quantities of ammonia and sulfur dioxide will first raise the pH of the solution as the ammonia is absorbed, and then lower it on addition of the sulfur dioxide, the pH of the resulting solution being about the same as that of the original solution. On reaction with hydrogen sulfide, the solution pH is reduced as the ammonium bisulfite and/or sulfurous acid are converted to stronger thiosulfuric acid and its ammonium salts. As the lower thiosulfate reduction reaction (4) is completed, the pH again increases to about the original level.

All of the reactions noted above occur in an aqueous ammonium thiosulfate solution, a portion of which also usually serves as an absorbent for the ammonia, although other solutions may also be used as absorbents. The products of the hydrogen sulfide reactions are, except at the extremes of concentration range, an aqueous ammonium thiosulfate solution containing elemental sulfur crystals. Although these crystals are extremely finely divided, they can be removed by air flotation, filtration, or other separatory means. Thus, the final products of my process are finely divided elemental sulfur and a concentrated ammonium thiosulfate solution. As will be hereinafter described, the finely divided elemental sulfur can be further processed to molten liquid sulfur, all or a portion of which can then be oxidized to supply the sulfur dioxide requirement of the process. Minor amounts of polythionic acids can also be formed, but these react further with hydrogen sulfide to form thiosulfate and/or sulfur by reactions such as:

$$H_2S_3O_6 + H_2S \rightarrow 2H_2S_2O_3 \qquad (8)$$

In any event, no appreciable quantities of polythionates are contained in the final product of my process, thus constituting a marked advantage over some of the prior art processes, such as that of U.S. Patent No. 1,868,843 to Overdick, which yield considerable quantities of polythionates.

The above reactions are believed the mechanisms whereby ammonia and hydrogen sulfide are converted to ammonium thiosulfate and sulfur in my process. Even though the actual mechanism may not be completely understood, or may be otherwise than as set forth above, I have conclusively demonstrated that ammonia and hydrogen sulfide can be reacted to ammonium thiosulfate and/or sulfur by the method set forth herein.

Since the net reaction of my process is exothermic, heat will build up which must be removed, either by radiation losses to the atmosphere or by interchange of the hot reaction media with a coolant. A desirable temperature range is from about 35° C. to about 70° C., although temperatures up to about 100° C. or higher can be employed depending upon the system pressure, the upper limit being established by the boiling point of the solution. The lower limit of the operable temperature range is established by the temperature at which precipitation of salts commences. A higher temperature favors increased reaction rates, but reduces the absorptivity of the gases in the ammonium thiosulfate solution. Thus, the effect of a temperature change on reaction rate depends on whether the reaction rate is, under those conditions, controlled by chemical reaction rate or by gas absorption rates.

My process is suitable for treating gases at any pressure depending on the supply pressure and the required product pressure. In most applications, the inlet gas pressure will vary from about atmospheric up to about 100 p.s.i.g. and the gas production pressure, if any gas is produced, will be somewhat lower due to the pressure drop through the treating system. This range of pressures is dictated by convenience, as there is no theoretical reason why my treating process cannot be conducted at subatmospheric pressures or at pressures substantially exceeding 100 p.s.i.g. Higher pressures increase gas absorptivities, thereby reducing absorber sizes, and under conditions where the reaction rate is limited by gas solubility, will increase the reaction rate.

The process of my invention can be conducted either batchwise or continuously depending on the nature of the feed stream and the purpose of the treatment. One embodiment of a continuous version of my process can be conducted in accordance with the attached flow diagram, wherein is seen a feed gas entering ammonia absorber 1 through line 2. This feed gas can be a mixture of ammonia and hydrogen sulfide varying in composition from equal molar quantities of each of these gases to a mixture containing primarily hydrogen sulfide or a mixture containing primarily ammonia. As noted above, ammonia conversion is limited to a quantity not exceeding an amount equivalent to 3.0 moles of ammonia per mole of hydrogen sulfide. Alternately, various proportions of ammonia and hydrogen sulfide can be in combination with other gases or can be separately fed to the process. Where the ammonia and the hydrogen sulfide are not admixed, the ammonia can be fed through line 2 and the hydrogen sulfide through line 55 and valve 54, in which case valve 53 is closed. Where the feed gases are admixed, valves 52 and 54 are closed and valve 53 opened. Excess ammonia or inerts contained in the ammonia feed, are vented through line 51 and valve 52. Ammonia absorber 1 is a conventional liquid-gas countercurrent contacting vessel containing bubble cap plates, perforated trays or packed sections. The feed gas enters ammonia absorber 1 at a point somewhat above the bottom of the contacting zone. An aqueous solution of ammonium thiosulfate enters at the top of ammonium absorber 1 through line 3 and valve 56 and passes downwardly through the absorber in countercurrent contact with the upwardly flowing gas to absorb ammonia from the feed gas mixture. Although only a portion of the recycled ammonium thiosulfate reaction media is normally required for ammonia absorption, this amount depends on the feed rate and composition, the absorption conditions and the efficiency of ammonia absorber 1.

Carbon dioxide gas is introduced into ammonia absorber 1 through line 4 and valve 50, at a point below the contacting zone, in just sufficient quantity to displace any dissolved hydrogen sulfide from the ammonium thiosulfate solution containing the absorbed ammonia passing out of the bottom of absorber 1. Although carbon dioxide stripping is not absolutely necessary, it is advantageous particularly where inerts contained in the sulfur dioxide are vented to the atmosphere. Thus, the section of the contacting zone of ammonia absorber 1 below the point of feed gas entry is a stripping section serving the sole purpose of preventing hydrogen sulfide from being retained in the ammonia thiosulfate solution leaving absorber 1. Displacement of substantially all of the absorbed hydrogen sulfide is particularly important where the sulfur dioxide is obtained from combustion of sulfur or byproduct recovery as absorbed hydrogen sulfide would be stripped from the solution on contact with the sulfur dioxide and vented with the inerts from the sulfur dioxide contacting step.

The ammonia content of the feed gas is substantially lowered by contact with the ammonium thiosulfate solution and if proper contacting is obtained can be substantially completely removed. The substantially ammonia-free gaseous product from ammonia absorber 1 passes overhead through line 5 to hydrogen sulfide reactor 13, to be hereinafter described. The ammonium thiosulfate solution containing the absorbed ammonia passes out from the bottom of ammonia absorber 1 through line 6 to sulfur dioxide absorber 7 wherein it is contacted with gaseous sulfur dioxide passing countercurrent thereto. The aqueous ammonium thiosulfate solution containing absorbed ammonia enters sulfur dioxide absorber 7 through line 6 at the top thereof, in combination with additional ammonium thiosulfate solution entering through line 8 and valve 57 which has not been passed through ammonia absorber 1. Sulfur dioxide absorber 7 is also a conventional liquid-gas contacting vessel comprising a vessel containing perforated trays, bubble cap plates or packed sections. The aqueous solution of ammonium thiosulfate containing the absorbed ammonia from ammonia absorber 1, passes downwardly through sulfur dioxide absorber 7 whereupon the ammonia is reacted with sulfur dioxide passing upwardly therethrough to form ammonium bisulfite according to the reaction of Equation 1 or sulfurous acid according to the reaction of Equation 2. The sulfur dioxide gas enters at the bottom of sulfur dioxide absorber 7 through line 11. Unreacted sulfur dioxide gas and any inert gases contained in the entering sulfur dioxide are vented from the top of absorber 7 through line 9 and valve 10. The aqueous solution of ammonium thiosulfate and the products of the sulfur dioxide absorption passes from the bottom of sulfur dioxide absorber 7 through line 12 to hydrogen sulfide reactor 13 wherein the main conversion reactions occur.

Any convenient means of contacting the aqueous ammonium thiosulfate-bisulfite solution and the gaseous hydrogen sulfide can be employed. A concurrent method is utilized in the embodiment described herein, wherein the gaseous hydrogen sulfide is introduced into the contacting zone at a plurality of points. Hydrogen sulfide reactor 13 can contain conventional gas-liquid contacting means to achieve intimate contacting of the upward flowing gas with the upward flowing liquid. The substantially ammonia-free feed gas is introduced to reactor 13 through line 5 and internal distributors 5a, 5b, 5c and 5d. Any number of such distributors can be used as necessary to achieve distribution throughout the contact zone. Other contacting devices such as baffles, mixers, dispersers, etc., may be employed to increase reaction rates by reducing gas bubbles sizes and improving gas distribution within the reaction zone. Multiple internal distributors serve to increase agitation throughout the reaction zone, thereby, in many cases, making mechanical mixers unnecessary. Flow to the individual internal distributors can be controlled by valves 14a, 14b, 14c and 14d. Since it is desirable to control the ammonium thiosulfate concentration of the reaction media to avoid salt crystallization, makeup water can be added to the aqueous solution entering reactor 13 by means of makeup water line 15 and valve 16. Any unreacted gases exiting from hydrogen sulfide reactor 13 pass overhead through line 17 and valve 18. Alternately, valves 19 and 20 can be opened and gas recycled back to line 5 through line 21 and compressor 22. The hydrogen sulfide content of these gases is substantially reduced from that of the feed gases, and in fact in many cases the product gas will be substantially free of hydrogen sulfide. Valve 18 can be closed and the total overhead gas recycled back to the reactor feed, particularly where the feed gas is a mixture of ammonia and hydrogen sulfide without additional gaseous components.

The aqueous liquid product from hydrogen sulfide reactor 13 is withdrawn at the top of reactor 13 through line 23 whereupon it passes to sulfur flotation separator 24. Air or other gas is introduced through line 25 and distributor 26, the gas passing upwardly through the liquid phase contained in separator 24 causing the sulfur to float to the top, from which point it can be withdrawn as a froth through line 27. A first substantially sulfur-free clarified ammonium thiosulfate solution is withdrawn from the bottom of sulfur flotation separator 24 through line 28. Any of the flotation gas which separates from the solution can be withdrawn through line 47 and valve 48.

The elemental sulfur formed by the reaction in hydrogen sulfide reactor 13 is in a finely divided crystalline state suitable for agricultural or other purposes and can be recovered by filtration. Alternately, the sulfur froth produced in sulfur flotation separator 24 can be heated to melt the sulfur, thereby yielding a molten sulfur product. If desirable, a portion of the sulfur may be recovered by filtration and the balance thereof recovered by melting. In the first instance, the sulfur slurry produced from line 27 passes through line 29 and valve 30 to sulfur filter 31 wherein the solid crystalline sulfur is separated from the aqueous ammonium thiosulphate solution. Solid sulfur passes from filter 31 through solids conduit 32 and the aqueous filtrate is removed through line 33 as a second clarified ammonium thiosulfate solution. The solid sulfur may be subjected to a wash step to remove occluded ammonium thiosulfate, if desired. Any entrained flotation gas is vented from the filter chamber through line 34. Where a molten product is desired, the sulfur slurry leaving the flotation separator through line 27 is diverted through line 35 and valve 36 to sulfur melter 37. Heat is provided by condensing steam in coils 38, or by other suitable heating means, and the molten sulfur is withdrawn through line 39 and valve 49. Any entrained flotation gas is removed through line 40 and valve 46, and the sulfur free ammonium thiosulfate solution is produced through line 41 as a second clarified ammonium thiosulfate solution or in the case where a portion of the sulfur is recovered by filtration, as a third clarified solution. Sulfur melter 37 must be maintained under a slight positive pressure, usually not exceeding 10 p.s.i.g., to prevent vaporization of water at the elevated temperature of the melter. Pressure is regulated by valve 46 in vent gas line 40. The ammonium thiosulfate solution produced from sulfur flotation separator 24 through line 28, from sulfur filter 31 through line 33, and from sulfur melter 37 through line 41 are combined in line 42 and returned to ammonia absorber 1 and sulfur dioxide absorber 7 through lines 3 and 8 respectively after passing through cooler 47 wherein the ammonium thiosulfate solution temperature is reduced to an acceptable level usually between about 35° C. and about 70° C. Heat removal is necessitated because of the exothermic reactions and heat input to sulfur melter 37. Alternately, the cooled solution may be filtered to remove any residual sulfur crystals. Ammonium thiosulfate product solution is withdrawn from line 42 through line 43.

On storage, ammonium thiosulphate solutions tend to decompose and precipitate colloidal sulfur unless the solution is maintained approximately neutral or slightly alkaline. The pH of the product ammonium thiosulfate solution can be properly adjusted for storage by bypassing a small slip stream of ammonia-rich ammonia absorber bottoms through line 44 and valve 45 to the product solution discharged through line 43.

The sulfur dioxide requirement can be supplied from any convenient commercially available source, or it can be manufactured, or obtained from byproduct recovery. The selection of a source of supply depends on availability and economics. One particularly suitable source of sulfur dioxide is combustion of the molten sulfur produced from the process. In such case, sulfur froth would be diverted to sulfur melter 37 to provide the necessary sulfur dioxide on combustion. Sufficient sulfur will be available to supply all the sulfur dioxide needed in any case where the amount of ammonia in the feed gas mixture is equal to or less than the amount of hydrogen sulfide contained therein. The remaining sulfur froth can be filtered or produced as molten sulfur, depending on product demands.

Another source of sulfur dioxide can be found in the combustion gases from a fuel source containing sulfur. The sulfur dioxide can be removed from the stack gases by scrubbing with a portion of the ammonium thiosulfate solution or with ammonium thiosulfate solution containing absorbed ammonia from the ammonia absorption step. Thus, not only is the necessary sulfur dioxide requirement supplied, but sulfur emission to the atmosphere is decreased, thereby reducing atmospheric pollution.

One particular advantage of my ammonium thiosulfate process is that the product is in the form of a concentrated solution without further necessity of evaporation. Thus, solution shipping costs are minimized and supplemental evaporation costs are eliminated. More dilute solutions can be obtained by merely adding water to the ammonium thiosulfate product solution. Crystalline ammonium thiosulfate can be produced from the concentrated solution, at minimum expense, by chilling or evaporation.

The following example is illustrative of my invention, but is not intended as a limitation thereof:

EXAMPLE I

An equimolar mixture of ammonia and hydrogen sulfide is reacted according to the embodiment of my process shown in the process flow diagram hereof. A feed gas containing equal mol ratios of ammonia and hydrogen sulfide is fed to the ammonia absorber at a rate of 20,000 mols/hr. and at a temperature of 60° C. Absorption of the ammonia portion of the feed gas is obtained by countercurrent contact with 7,000 liters/hr. of ammonium thiosulfate solution in the ammonia absorber. Hydrogen sulfide is stripped from the ammonia absorber bottoms by carbon dioxide gas introduced into the absorber bottom at a rate of 225 mols/hr. The resulting gas product, essentially free of ammonia, is passed from the top of the ammonia absorber to the hydrogen sulfide reactor. The ammonia solution from the bottom of the ammonia absorber is combined with the main ammonium thiosulfate recycle stream, flowing to the sulfur dioxide absorber at a rate of 43,000 liters/hr., resulting in a total liquid entering the top of the sulfur dioxide absorber of approximately 50,000 liters/hr. This stream passes downwardly through the absorber in countercurrent flow to the upward flowing sulfur dioxide gas entering the bottom thereof at a rate of 10,000 mols/hr. The net liquid product obtained from this reaction amounts to approximately 50,500 liters/hr. of ammonium thiosulfate solution containing approximately 10,000 mols/hr. of ammonium bisulfite.

The 50,500 liters/hr. of ammonium bisulfite solution and approximately 460 liters/hr. of makeup water are fed to the hydrogen sulfide reactor for concurrent contacting with the ammonia-free hydrogen sulfide gas from the ammonia absorber. A net liquid product amounting to approximately 51,160 liters/hr. is obtained. Air flotation results in approximately 5,360 liters/hr. of sulfur froth and 45,800 liters/hr. of clarified product. The froth is heated in the sulfur melter by condensing steam to yield approximately 320 kg./hr. of molten sulfur product and 5,200 liters/hr. sulfur-free ammonium thiosulfate solution.

The ammonium thiosulfate solution from the sulfur melter and the clarified solution from the separator are combined to yield 51,000 liters/hr. of solution, 1,000 liters/hr. of which is produced as net ammonium thiosulfate product at a concentration of 5.0 mols/liter. Net ammonium thiosulfate production amounts to 1,290 kg./hr. of the salt. The remaining 50,000 liters/hr. of ammonium thiosulfate solution is returned to the process as absorption and reaction media. The makeup water rate is set to maintain an ammonium thiosulfate concentration of 5.0 mols/liter in the circulating solution. If desired, a portion of the ammonia absorber bottoms can be diverted to the final product for pH adjustment.

Various other changes and modifications of this invention are apparent from the description thereof and further modifications and variations will be obvious to those skilled in the art. Such modifications and changes are intended to be included within the scope of this invention as defined by the following claims.

I claim:

1. A process for treating gases comprising:
  contacting a first gaseous feed mixture comprising hydrogen sulfide and ammonia, the proportion of said ammonia being not greater than about 3.0 moles of ammonia per mole of hydrogen sulfide, with an aqueous solution of ammonium thiosulfate to absorb a substantial portion of said ammonia from said first gaseous feed mixture, thereby yielding a second gaseous mixture of reduced ammonia content and an ammonia-rich solution of ammonium thiosulfate;
  removing any absorbed hydrogen sulfide from said ammonia-rich solution of ammonium thiosulfate to yield an ammonia-rich solution of ammonium thiosulfate substantially free of hydrogen sulfide;
  absorbing sulfur dioxide in said ammonia-rich solution of ammonium thiosulfate in the absence of any substantial quantity of hydrogen sulfide; and
  contacting said second gaseous mixture with said ammonia-rich solution of ammonium thiosulfate containing said absorbed sulfur dioxide whereby a hydrogen sulfide portion of said second gaseous mixture reacts with said absorbed ammonia and said absorbed sulfur dioxide to form ammonium thiosulfate in a second ammonium thiosulfate solution.

2. The process of claim 1 wherein a stoichiometric quantity of 0.5 mole of said sulfur dioxide is absorbed in said ammonia-rich solution for each mole of ammonia plus hydrogen sulfide reactant, thus obtaining substantially complete reaction of said hydrogen sulfide and said ammonia.

3. The process of claim 1 wherein said reaction with hydrogen sulfide is conducted at a temperature between about 35° C. and about 100° C.

4. The process of claim 1 wherein said hydrogen sulfide is removed from said ammonia-rich solution of ammonium thiosulfate by stripping said solution with carbon dioxide prior to contacting said solution with said sulfur dioxide.

5. The process of claim 1 wherein said first gaseous feed mixture has an ammonia content of substantially 3.0 moles of ammonia per mole of hydrogen sulfide, the product of said reaction with said hydrogen sulfide being essentially ammonium thiosulfate.

6. The process of claim 1 wherein an unreacted portion of said first gaseous mixture is separated from said second solution of ammonium thiosulfate.

7. The process of claim 6 wherein at least a portion of said separated gases are recycled to combine with said second gaseous mixture prior to said reaction to form ammonium thiosulfate.

8. The process of claim 1 wherein the proportion of said ammonia is less than about 3.0 moles of ammonia per mole of hydrogen sulfide, ammonium thiosulfate and elemental sulfur being produced by said reaction with hydrogen sulfide, and including the step of removing said elemental sulfur from said second ammonium thiosulfate solution resulting from said reaction with said hydrogen sulfide, thereby yielding a first clarified solution of ammonium thiosulfate substantially free of said elemental sulfur.

9. The process of claim 8 wherein said elemental sulfur is removed from said second solution of ammonium thiosulfate by:
  passing a gas upwardly through a reservoir of said solution causing said elemental sulfur to rise to an upper level of said reservoir to form a froth of said elemental sulfur in a portion of said ammonium thiosulfate solution;
  withdrawing a remaining portion of said ammonium thiosulfate solution from a lower level of said reservoir as said substantially elemental sulfur free first clarified ammonium thiosulfate solution; and
  withdrawing said sulfur froth from said upper level of said reservoir.

10. The process of claim 9 including the steps of:
  removing said elemental sulfur from said sulfur froth to recover a second clarified ammonium thiosulfate solution and an elemental sulfur product;
  combining said first and said second clarified ammonium thiosulfate solutions;
  withdrawing a portion of said combined ammonium thiosulfate solution as final product; and
  recycling a remaining portion of said combined ammonium thiosulfate solution to said sulfur dioxide absorption step, a portion of said recycled ammonium thiosulfate solution being diverted to said ammonia absorption step prior to contacting said sulfur dioxide.

11. The process of claim 10 wherein said elemental sulfur is removed from at least a portion of said sulfur froth by heating said sulfur froth under superatmospheric pressure to melt said elemental sulfur, said superatmospheric pressure being sufficient to prevent vaporization of water from said aqueous solution at the temperature required to melt said sulfur, the molten sulfur formed thereby separating into a separate liquid phase from said ammonium thiosulfate solution, withdrawing said molten sulfur from said sulfur phase, and withdrawing said second clarified ammonium thiosulfate solution from said ammonium thiosulfate solution phase, said withdrawn solution being substantially free of said elemental sulfur.

12. A process for converting ammonia and hydrogen sulfide to ammonium thiosulfate and sulfur comprising:
  introducing a feed gas mixture comprising hydrogen sulfide and ammonia, the proportion of said ammonia being less than 3.0 moles of ammonia per mole of hydrogen sulfide, into an intermediate point of a first contacting zone and introducing an aqueous solution of ammonium thiosulfate into the top of said contacting zone, said ammonium thiosulfate solution passing downwardly through said first contacting zone countercurrently to said gaseous mixture flowing upwardly therethrough and absorbing a substantial portion of said ammonia from said gaseous mixture, a substantially ammonia-free unabsorbed portion of said feed gas mixture passing overhead from said first contacting zone;
  introducing carbon dioxide into the bottom of said first contacting zone, said carbon dioxide passing upwardly therethrough and displacing absorbed hydrogen sulfide therefrom, said substantially hydrogen sulfide-free ammonium thiosulfate solution containing absorbed ammonia being withdrawn from the bottom of said first contacting zone;

combining said ammonium thiosulfate solution containing absorbed ammonia from said first contacting zone with substantially ammonia-free recycled ammonium thiosulfate solution;

introducing said combined ammonium thiosulfate solution to the top of a second contacting zone and introducing sulfur dioxide to the bottom of said second contacting zone in the proportion of 0.5 mole of sulfur dioxide per mole of total hydrogen sulfide plus ammonia reactants in said feed gas mixture, said combined solution passing downwardly through said second contacting zone countercurrently to said sulfur dioxide passing upwardly therethrough, said sulfur dioxide being absorbed by said down-flowing solution, and withdrawing said ammonium thiosulfate solution containing said absorbed ammonia and said absorbed sulfur dioxide from said second contacting zone;

introducing said solution withdrawn from said second contacting zone into the bottom of a third contacting zone, said solution passing upwardly therethrough and introducing said substantially ammonia-free unabsorbed portion of said feed gas mixture from said first contacting zone into at least one point of said third contacting zone, said unabsorbed gases passing upwardly through said third contacting zone concurrently with said ammonium thiosulfate solution, said hydrogen sulfide portion thereof reacting with said absorbed ammonia and said absorbed sulfur dioxide to form a reaction product comprising ammonium thiosulfate and solid elemental sulfur, the temperature of said third reaction zone being between about 35° C. and about 100° C.;

withdrawing an aqueous solution of ammonium thiosulfate having solid elemental sulfur suspended therein from an upper level of said third contacting zone;

removing said solid elemental sulfur from said ammonium thiosulfate solution by passing a gas upwardly through a reservoir of said solution causing said solid elemental sulfur to rise to an upper level of said reservoir to form a froth of said solid elemental sulfur in a portion of said ammonium thiosulfate solution, said sulfur froth being withdrawn from an upper level of said reservoir, and withdrawing a remaining portion of said ammonium thiosulfate solution as a first clarified ammonium thiosulfate solution, said withdrawn first clarified solution being substantially free of said solid elemental sulfur;

removing said solid elemental sulfur from said sulfur froth to form a second clarified ammonium thiosulfate solution, said second clarified solution being substantially free of said solid elemental sulfur;

combining said first and said second clarified ammonium thiosulfate solutions;

cooling said combined first and second clarified ammonium thiosulfate solution to a temperature between about 35° C. and about 100° C.;

withdrawing a portion of said combined ammonium thiosulfate solution as final product; and recycling a remaining portion of said cooled ammonium thiosulfate solution, a portion of said recycled solution passing to the top of said first contacting zone and a remaining portion of said recycled solution passing to the top of said second contacting zone together with said ammonium thiosulfate solution containing said absorbed ammonia from said first contacting zone.

13. The process of claim 12 wherein unreacted gases passing upwardly through said third contacting zone and exiting therefrom are separated from said aqueous solution of ammonium thiosulfate having solid elemental sulfur suspended therein, said unreacted gases being withdrawn therefrom.

14. The process of claim 13 wherein at least a portion of said withdrawn unreacted gases are recycled to said third contacting zone.

15. The process of claim 12 wherein said solid elemental sulfur is removed from at least a portion of said sulfur froth by heating under superatmospheric pressure to melt said solid elemental sulfur, said superatmospheric pressure being sufficient to prevent vaporization of water from said aqueous solution at the temperature required to melt said sulfur, the molten sulfur formed thereby separating into a separate liquid phase from said ammonium thiosulfate solution, withdrawing said molten sulfur from said sulfur phase as a liquid sulfur product and withdrawing said second clarified ammonium thiosulfate solution from said ammonium thiosulfate solution phase, said withdrawn solution being substantially free of said molten sulfur.

References Cited

UNITED STATES PATENTS

| 1,079,291 | 11/1913 | Field | 23—225 |
| 1,795,121 | 3/1931 | Hansen | 23—115 X |
| 1,855,856 | 4/1932 | Hansen | 23—3 X |
| 1,957,265 | 5/1934 | Hansen | 23—130 X |
| 2,219,258 | 10/1940 | Hill | 23—115 |

FOREIGN PATENTS 947,640   1/1964   Great Britain.

OSCAR R. VERTIZ, *Primary Examiner.*

EARL C. THOMAS, *Assistant Examiner.*

U.S. Cl. X.R.

23—2, 130, 225